United States Patent Office 3,050,646
Patented Aug. 21, 1962

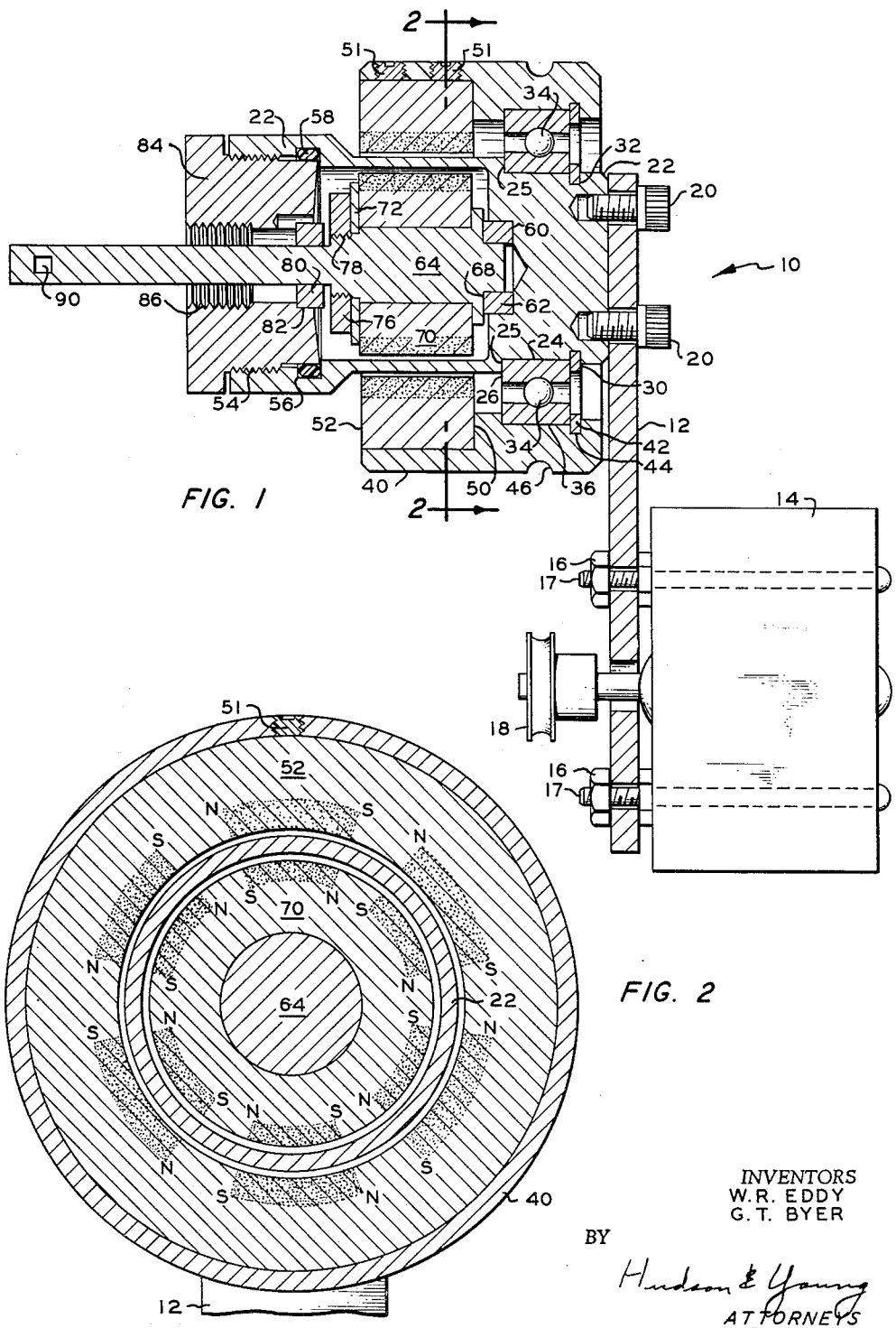

3,050,646
MAGNETIC COUPLING
William R. Eddy and George T. Byer, Bartlesville, Okla., assignors to Phillips Petroleum Company, a corporation of Delaware
Filed Jan. 6, 1958, Ser. No. 707,369
4 Claims. (Cl. 310—104)

This invention relates to a magnetic coupling. In one aspect it relates to improvements in magnetic couplings to render them substantially corrosion proof.

In chemical plants and in laboratory equipment it is often desired to mix or agitate corrosive substances. Frequently, it is necessary to seal the materials being mixed in a closed container because it is desired to carry out the mixing under pressure or because of the noxious character of the materials.

Where it is desired to carry out such mixing or agitation continuously a problem occurs in how to deliver power inside a sealed vessel. Mechanical rotary seals have not been satisfactory in all applications because some leakage occurs. One solution that has been attempted is to use a magnetic coupling which will permit disposing the driving and the driven parts of the coupling on opposite sides of the partition which seals vessels such as that mentioned above. However, a problem is created in that the magnetic materials, for example iron and steel, are subject to corrosion and frequent replacement becomes necessary. In addition, contamination of the solutions being treated and power loss occur when such materials are used. In laboratory equipment, the use of conventional magnetic materials requires many small, or a few physically large magnets to transmit the torque (power) necessary; this in turn causes the coupling, hence the stirrer, to be large and bulky, hence awkward for laboratory use.

This invention provides a magnetic coupling having corrosion proof properties. Ceramic material such as barium ferrite ($BaFe_{12}O_{19}$) is used for the magnets in the coupling. Such a magnetizable material is sold as "Indox I," a product of the Indiana Steel Products Company, Valparaiso, Indiana. Use of the ceramic material solves the problems of frequent replacement, power loss, contamination, and corrosion. This material also has the advantages of being very difficult to demagnetize, and of being magnetizable in such a manner as to create a plurality of pairs of magnetic poles in one piece of this ceramic.

Accordingly, it is an object of this invention to provide a magnetic coupling having a high corrosion resistance. It is a further object of this invention to provide an improved magnetic coupling suitable for use with a stirrer. Another object of the invention is to provide a magnetic coupling that is leakproof. Other objects and advantages will become apparent from the following disclosure.

In the drawings, FIGURE 1 is a cross section of a magnetic coupling. FIGURE 2 is a section through 2—2 of FIGURE 1 showing, in particular, the arrangement of the "Indox I" magnets.

Referring now to FIGURES 1 and 2, an assembled coupling and drive 10 is illustrated. All parts are preferably made of stainless steel or other suitable non-corrosive materials unless otherwise noted. In the assembly 10, the support 12 has a motor 14 secured to it by nuts 16 and bolts 17. The motor is provided with a pulley 18 from which power can be transmitted by a belt, not shown, for purposes of clarity.

At the opposite end of the support 12, bolts 20 secure a stationary housing 22 thereto. The housing preferably is cup shaped to thereby provide a means for sealing the vessel to which the assembly may be attached. A machined surface 24 and a shoulder 25 on the housing provide means for mounting the inner race 26 of a ball bearing. The inner race is held in position by a retainer 30 mounted in a retainer groove 32.

The ball bearing is provided with a race, not shown, to space the balls 34. Radially outward of the balls 34 is disposed an outer race 36 which is fitted to sleeve 40 and retained therein by a retainer 42 that fits in a retainer groove 44. The sleeve is provided with a belt groove 46 which is aligned with the pulley 18. A shoulder 50 and flat pointed set screws 51 are provided as positioning means for the magnet 52. Other details of this magnet will be described hereinafter.

At the outboard or left end of the housing as viewed in FIGURE 1 are machined internal threads 54 for a purpose which will hereinafter be disclosed. A groove 56 is provided as a seating and positioning means for an O-ring 58 that is made of "Teflon" in the preferred embodiment. At the internal right end of the housing is positioned a shouldered surface 60 into which is fitted a bearing 62. The bearing 62, in order to be corrosion proof and to provide a means of lubrication which will not contaminate substances to which it is exposed is preferably made of graphite. Where oil vapor atmospheres are anticipated, conventional bearing materials are suitable.

A shaft 64 is mounted in the bearing 62 and is positioned therein by a collar bearing 68 which in the embodiment shown is machined integrally with the shaft. Immediately to the left of the collar 68 is disposed a second magnet 70 which is held in place by a retaining washer 72 which is in turn fixed by a retaining nut 76 that engages the threads 78 machined on shaft 64.

To provide support for the left end of the shaft as seen in FIGURE 1, another bearing 80 is provided. Bearings 62 and 80 are made of the same materials and bearing 80 is mounted on a shouldered surface 82 of a threaded connector 84 which engages the threads 54 of the housing 22. Internally of the connector are provided threads 86 which can sealingly engage an agitator vessel for instance. Flanges or other such means of attaching the assembly could be provided instead. At the extreme left end of the shaft are found flats 90 which provide a means for linking the coupling to the member that is to be driven. Obviously, other linking means could be used, or the driven member could be integral with the shaft, if desired.

The magnets 52 and 70 are made of ceramic material, preferably barium ferrite ($BaFe_{12}O_{19}$). As seen in FIGURE 1, these two magnets are disposed close to each other and are separated only by housing 22 and the necessary mechanical clearance. As seen in FIGURE 2, these magnets are arranged so that the magnetic portions thereof are on the cylindrical surfaces of the respective magnets. In the embodiment shown, these poles are on the inside diameter of the magnet 52 and on the outside diameter of the magnet 70. Although other arrangements of the poles are possible, this is the preferred embodiment. In the arrangement shown, 12 poles are shown for each magnet and by properly dimensioning the spacing thereof are arranged so that each north pole of element 52 has a corresponding south pole which it can engage on magnet 70 and vice versa. As shown in FIGURE 1, in particular, there are various shoulders and machined surfaces provided whereby the parts can be readily positioned with respect to each other.

The general characteristics of the preferred type barium ferrite ("Indox I") are: magnetizing force, 1600–1700 oersteds; flux density, 200–2100 gauss; resistivity about $1 \times 10_6$ to $10 \times 10_6$ ohm-cm.; specific gravity=4.7; density=0.17 lb./cu. in.; temperature coefficient=−0.19%/°C.; maximum energy product =$0.95 \times 10_6$ gauss-oersted/ cc. (approximately); magnetizing field for saturation= 10,000 oersted or 20,000 amp. turns/in. This ceramic is made from a powdered mixture of barium carbonate and iron oxide, which is pressed to the desired shape, sintered, and magnetized. The die must be designed to allow for a shrinkage to ⅞ of the pressed size. If desired, the sintered magnet can be finished by grinding. It is extremely difficult to machine or drill, therefore the die design should be such as to avoid machining except for grinding.

It is believed that the foregoing description and the drawings make the construction and operation of the invention obvious to one skilled in the art. The motor 14 delivers power to sleeve 40 which turns on the bearings 26—34—36. The magnetic flux between matching poles of magnets 52 and 70 causes the shaft 64 to turn at the same angular velocity as the sleeve 40. In the construction shown, use of this coupling with a sealed vessel is entirely feasible, the possibility of leakage being eliminated by the sealing connection provided at threads 86. The apparatus is substantially corrosion proof because all elements are made of materials which do not normally corrode, for example, stainless steel, graphite, and barium ferrite.

In addition, the novel bearing arrangement supports the shaft at two points within the housing and thereby a sturdy unitary structure is provided, all working portions of which can be rendered easily accessible for servicing by removing this coupling assembly 10 from the vessel to which it may be attached in service. By providing a variety of connectors 84, (e.g. flanged, threaded) it is possible to apply the coupling to a wide variety of vessels. Due to the power of the magnets and the compact arrangement of parts, a compact, readily installed apparatus is provided. Due to the compactness, the installation problems of diametral and overhead clearances are minimized.

One embodiment of the invention has been provided with a one-tenth horsepower motor capable of various speeds in the range of 0–5000 r.p.m. and no failures have thus far occurred. The slip between the magnets 52 and 70 is negligible as demonstrated by the fact that the motor has been stalled by holding the output shaft 64 stationary. In this arrangement, both magnets were one inch thick and each had 12 poles, the magnet 52 being about three and one-eighth inches in outside diameter and about one and thirteen-sixteenths in inside diameter, the magnet 70 having an outside diameter of about one and five-eighths inches.

It is not our intention to limit ourselves to the embodiment shown but to include therein all advantages, features, and modifications which would be apparent to those skilled in the art. For example, more power can be transmitted by axially extending housing, shaft and sleeve and arranging additional magnets along the latter two.

We claim:

1. A magnetic coupling comprising a stationary cylindrical stainless steel housing, said housing having a wall across one end thereof to seal said one end, means on the other end of said housing forming a sealing engagement with a sealed vessel, an annular driving member surrounding said housing concentric therewith and extending longitudinally of said housing, bearing means on said housing concentric with said housing attached to its outer surface rotatably supporting said driving member, a stainless steel shaft within said housing rotatably mounted coaxially therewith, a stainless steel driven member mounted on said shaft concentric therewith, a first graphite support bearing for said shaft at said one end of said housing, a second graphite support bearing for said shaft spaced from said first bearing toward said other end of said housing, a plurality of magnets equally spaced circumferentially on the inner surface of said driving member, an equal number of magnets equally spaced circumferentially on the outer surface of said driven member, the poles of all of said magnets being arranged so that a plane perpendicular to the axis of said shaft may pass through all of said poles, said magnets on said driven member comprising a material including barium ferrite as a major constituent thereof.

2. A magnetic coupling comprising a stationary cylindrical corrosion-resistant housing, said housing having a wall across one end thereof to seal said one end, means on the other end of said housing forming a sealing connection with a sealed vessel, an annular driving member surrounding said housing concentric therewith and extending longitudinally of said housing, bearing means on said housing concentric with said housing attached to its outer surface rotatably supporting said driving member, a corrosion-resistant shaft within said housing rotatably mounted coaxially thereof, a corrosion-resistant driven member mounted on said shaft, concentric therewith, a first corrosion-resistant support bearing for said shaft at said one end of said housing, a second corrosion-resistant support bearing for said shaft spaced from said first bearing toward said other end of said housing, a plurality of magnets equally spaced circumferentially on the inner surface of said driving member, an equal number of magnets equally spaced circumferentially on the outer surface of said driven member, the poles of all of said magnets being arranged so that a plane perpendicular to the axis of said shaft may pass through all of said poles, said magnets on said driven member comprising a corrosion-resistant magnetic material.

3. Apparatus for transmitting rotary motion while maintaining a fluid-tight seal, comprising a stationary housing having a cylindrical exterior surface and a cylindrical chamber concentric with and axially aligned with said cylindrical surface, a continuous wall across one end of said housing providing a fluid-tight seal, means at the other end of said housing for attachment to a fluid-containing body and establishing fluid communication between the interior of said housing and the interior of said body, first bearing means within said housing adjacent one end of said cylindrical chamber and concentric therewith, second bearing means within said housing adjacent the other end of said cylindrical chamber and concentric therewith, a shaft rotatably supported by said first and second bearings, said shaft having means for connecting one end thereof with a driven member in said body, cylindrical means supported by said shaft within said cylindrical chamber between said first and second bearings and comprising first magnet means, a third bearing concentric with said housing attached to its outer surface, a driving member rotatably supported by said third bearing and having a cylindrical portion comprising second magnet means surrounding said cylindrical exterior surface, driving means for said driving member attached to the outside of said housing, said driving member through the interaction of said first and second magnet means causing rotation of said shaft.

4. The apparatus of claim 3 wherein said driving means comprising a motor supported by said housing, a pulley driven by said motor, a pulley groove on the outer surface of said driving member and a belt driven by said pulley and driving said driving member, the diameter of said pulley being smaller than the diameter of said pulley groove whereby said driving member rotates at a slower angular velocity than said motor.

References Cited in the file of this patent

UNITED STATES PATENTS

| | | |
|---|---|---|
| 2,101,665 | Arey | Dec. 7, 1937 |
| 2,386,505 | Puchy | Oct. 9, 1945 |
| 2,457,880 | Edwards | Jan. 4, 1949 |
| 2,463,409 | Moody | Mar. 1, 1949 |
| 2,556,854 | Spears | June 21, 1951 |
| 2,705,762 | Pile | Apr. 5, 1955 |
| 2,722,617 | Cluwen | Nov. 1, 1955 |
| 2,909,683 | Holzer | Oct. 20, 1959 |
| 2,931,928 | Fehn | Apr. 5, 1960 |

FOREIGN PATENTS

| | | |
|---|---|---|
| 670,682 | Great Britain | Apr. 23, 1952 |
| 715,277 | Great Britain | Sept. 8, 1954 |